United States Patent [19]
Yang

[11] Patent Number: 5,954,521
[45] Date of Patent: Sep. 21, 1999

[54] INTERFACE CARD CONNECTOR

[75] Inventor: George Yang, Shin-Lin District, Taiwan

[73] Assignee: All Best Electronics Co., Ltd., Hsin Chuang Taipei, Taiwan

[21] Appl. No.: 09/015,353

[22] Filed: Jan. 29, 1998

[51] Int. Cl.[6] .................................................. H01R 9/09
[52] U.S. Cl. .............................................. 439/59; 439/951
[58] Field of Search .................................. 439/327, 328, 439/377, 64, 59, 951, 76.1, 629

[56] References Cited

U.S. PATENT DOCUMENTS 5,156,552 10/1992 Zaderej et al. .............................. 439/59
5,205,738  4/1993 Anderson, Jr. et al. ................. 439/951

Primary Examiner—Hien D. Vu
Assistant Examiner—Briggitte R. Hammond
Attorney, Agent, or Firm—Pro-TECHTOR INTERNATIONAL SERVICES

[57] ABSTRACT

An interface card connector that includes a plastic main body and a PC board that includes a main portion and a front insertion portion. The insertion portion is provided on top and bottom surfaces with multiple elongated conductor contact strips. The plastic main body includes a transverse opening through which the insertion portion of the PC board extends. The protective side walls are provided on inner surfaces with guiding channels that receive the PC board. The PC board is pushed through the plastic main body in the guiding channels so that the insertion portion extends beyond the plastic main body, thereby enabling the contacts of the PC board to be directly electrically connected to a compatible connector.

2 Claims, 4 Drawing Sheets

3-3

6-6

INTERFACE CARD CONNECTOR

BACKGROUND OF THE INVENTION

The present invention relates to an improved interface card connector, and more particularly to an interface card connector which does not need conventional insertion terminals and includes a PC board having an extended insertion portion for directly inserting into a matching connector.

An interface card connector is used for interconnecting an interface card to another peripheral equipment. Connectors for such purpose further include male and female connectors to effect the connection.

FIG. 1 is an exploded perspective of a conventional interface card connector. As shown, the connector includes at least a plastic main body 1, a plurality of insertion terminals 2, and a PC board 3. The plastic main body 1 is formed of a plurality of terminal insertion holes 11 arranged in two corresponding rows, namely, an upper and a lower row. A portion of the plastic main body 1 between the upper and the lower rows of terminal insertion holes 11 extends and projects forward from the plastic main body 1 to form an insertion portion 12. The insertion portion 12 is provided on its top and bottom surfaces with terminal grooves 13 corresponding to the terminal insertion holes 11. The plastic main body 1 is provided at two sides with two protective walls 14 which symmetrically extend backward from the plastic main body 1. Two guiding channels 15 are separately provided on inner surfaces of the two protective walls 14, such that the guiding channels 15 are correspondingly located between the two rows of terminal insertion holes 11. The PC board 3 may be guided by the two guiding channels 15 to insert into the plastic main body 1. The insertion terminals 2 are formed by punching, bending, and cutting a strip of material into a desired shape and are inserted into the terminal insertion holes 11 in advance. The PC board 3 is an interface card manufactured depending on actual need. A plurality of conductor contacts 31 are provided on front top and bottom surfaces of the PC board 3 to respectively correspond to the insertion terminals 2 inserted in the upper and lower rows of terminal insertion holes 11.

FIG. 2 is an assembled perspective of the conventional interface card connector of FIG. 1, and FIG. 3 is a side sectional view taken on line A—A of FIG. 2. As shown, the PC board 3 is pushed forward to insert into the two guiding channels 15 extending backward from the plastic main body 1 until a front end of the PC board 3 presses against a rear end surface of the plastic main body 1. At this point, a front portion of the PC board 3 is clamped between terminals 2 separately inserted in the upper and lower rows of terminal insertion holes 11. The contacts 31 on front top and bottom surfaces of the PC board 3 are electrically connected to the terminals 2 by soldering. Whereby, the PC board 3 is indirectly connected to a peripheral equipment via the insertion portion 12 of the plastic main body 1 inserted into a matching connector.

Following drawbacks are found in the above-described conventional interface card connector structure:

1. The PC board 3 is electrically connected to the terminals 2 by soldering the contacts 31 on the PC board 3 to the terminals 2. However, the terminals 2 are manufactured from very complicate procedures and the soldering requires considerably high skill.
2. The plastic main body 1 must be preformed with terminal insertion holes 11 and the terminals 2 must be inserted into the terminal insertion holes 11 correctly. All these must be completed with additional time and labors.
3. The plastic main body 1 must have a forward extended insertion portion 12 on which multiple terminal grooves 13 must be formed. Therefore, additional material and labors are needed to form the insertion portion 12.

SUMMARY OF THE INVENTION

It is therefore a primary object of the present invention to provide an improved interface card connector structure in which a PC board including a main portion and an extended insertion portion with contacts is directly inserted into a matching connector on a peripheral equipment, so that the whole interface card connector can be simplified.

To achieve the above object, there is provided an interface card connector including a plastic main body and a PC board. The PC board has a main portion and an insertion portion extending forward from the main portion. A plurality of conductor contacts in long strip form are longitudinally arranged on top and bottom surfaces of the insertion portion. The insertion portion has a width slightly smaller than that of the main portion. The plastic main body is formed of a transverse opening for the insertion portion of the PC board to insert into and extend through. Two symmetrical protective walls extend backward from two sides of the plastic main body. Guiding channels are provided on inner surfaces of the protective walls corresponding to the transverse opening on the plastic main body. Distance between the two guiding channels equals to the width of the main portion of the PC board, so that the PC board can be guided by the guiding channels and pushed toward the plastic main body for the insertion portion to extend through the transverse opening and project from a front end of the plastic main body. At this point, the PC board can be directly electrically connected to a matching connector via the insertion portion.

BRIEF DESCRIPTION OF THE DRAWINGS

The objects, features, and functions of the present invention can be best understood by referring to the following detailed description of the preferred embodiment and the accompanying drawings, wherein.

DETAILED DESCRIPTION OF THE PREFERRED EMBODIMENT

Figure 1:
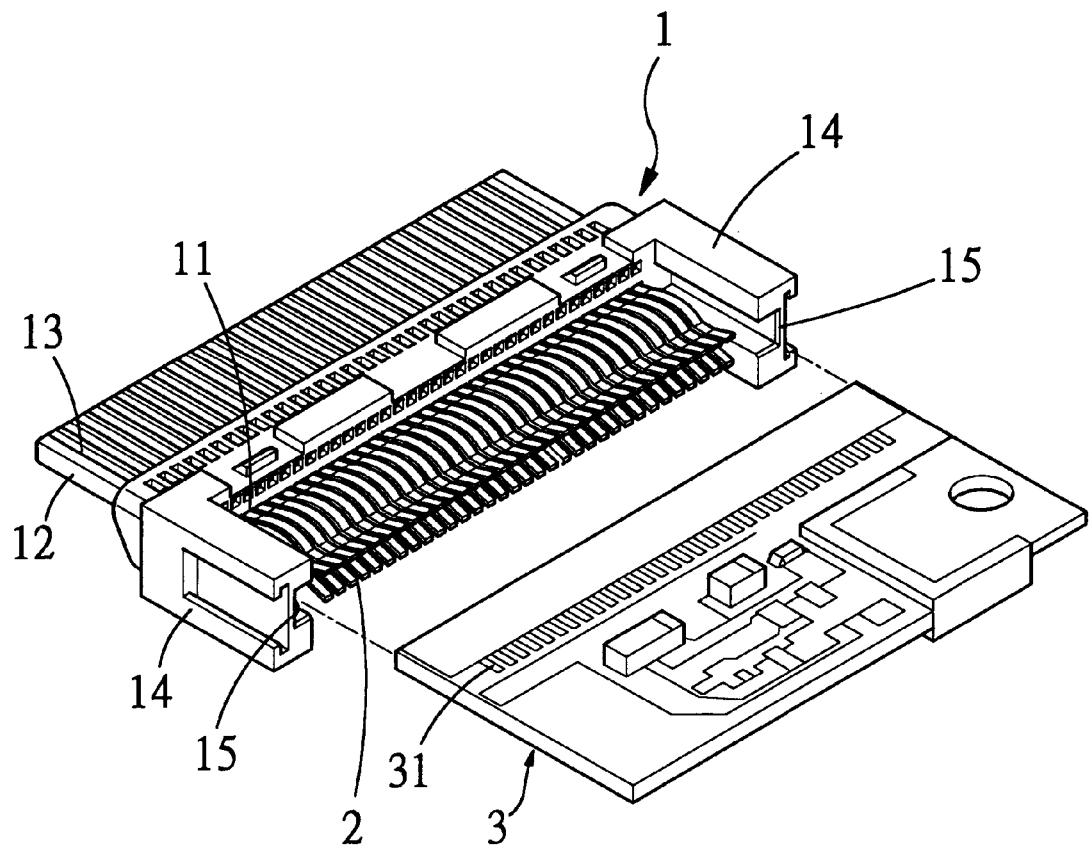
FIG. 1 is an exploded perspective of a conventional interface card connector.
Figure 2:
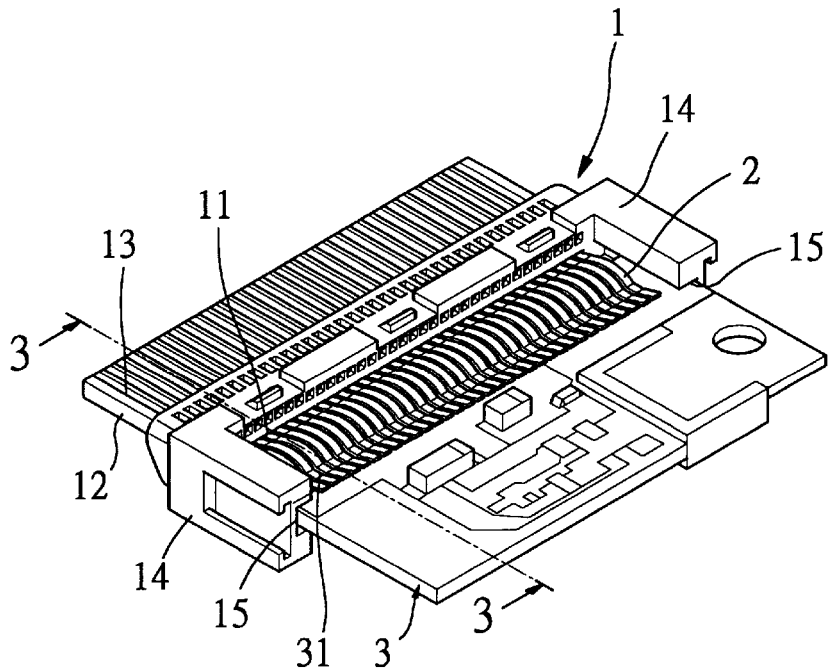
FIG. 2 is an assembled perspective of the conventional interface card connector of FIG. 1.
Figure 3:
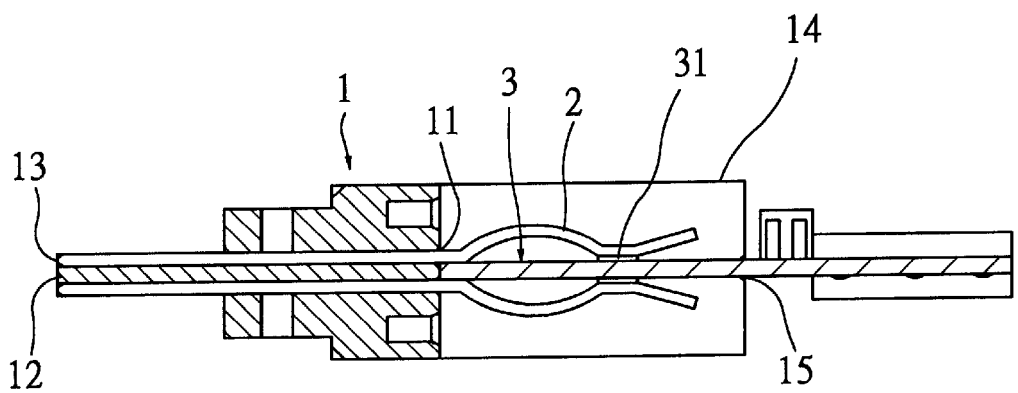
FIG. 3 is a side sectional view taken on line A—A of FIG. 2.
Figure 4:
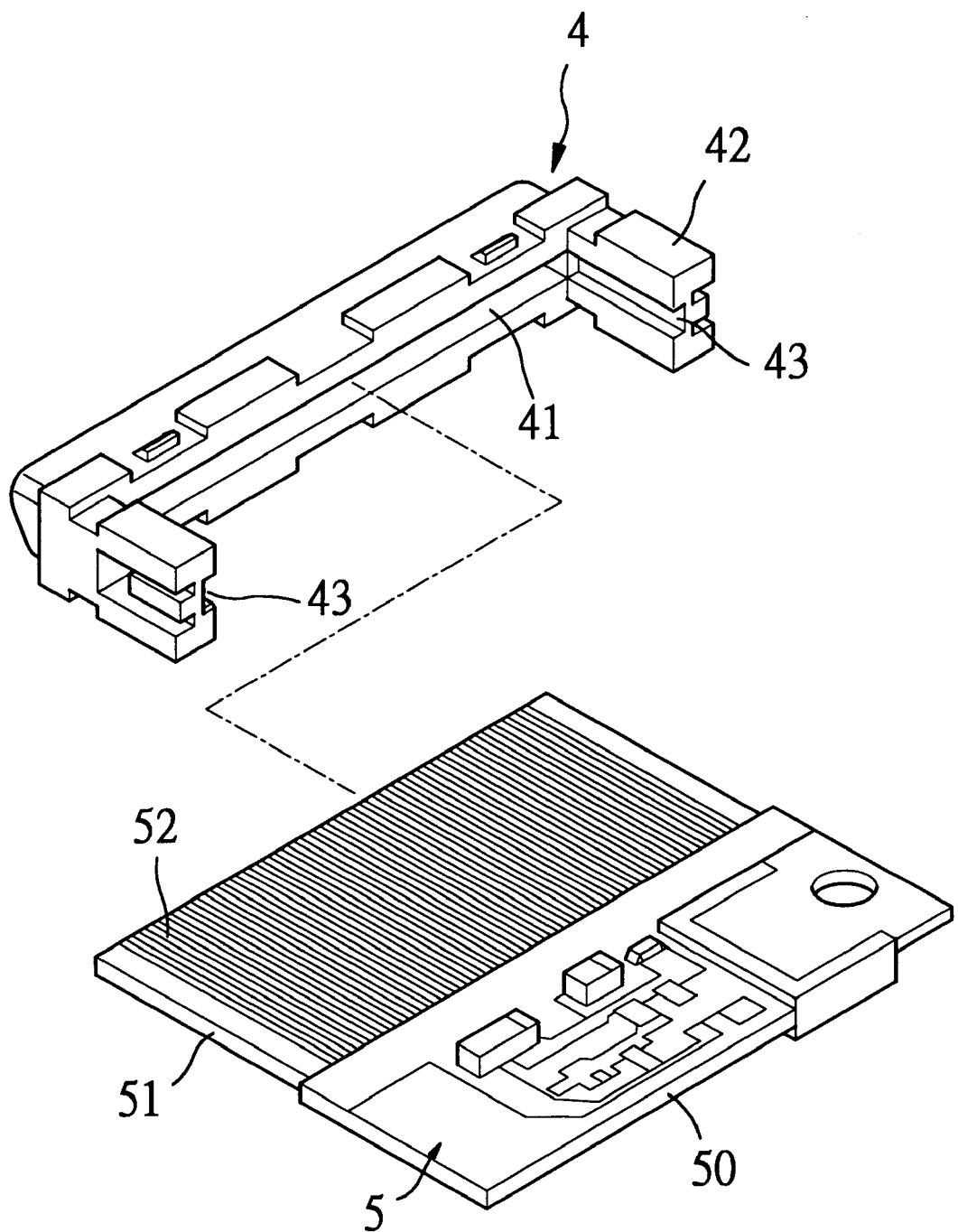
FIG. 4 is an exploded perspective of an interface card connector according to the present invention.

Please refer to FIG. 4. The present invention relates to an interface card connector and mainly includes a plastic main body 4 and a PC board 5.

The PC board 5 includes a main portion 50 and an insertion portion 51 which projects forward from the main portion 50 and has a width slightly smaller than that of the main portion 50. And, a plurality of conductor contacts 52 in long strip form are provided on top and bottom surfaces of the insertion portion 51.

The plastic main body 4 is formed of a transverse opening 41 just for the insertion portion 51 of the PC board 5 to insert into and extend through. Two symmetrical protective walls 42 are separately provided at two sides of the plastic main body 4 to extend backward for a suitable distance. The protective walls 42 are provided at inner surfaces with guiding channels 43 corresponding to the opening 41. A distance between the two guiding channels 43 equals to the width of the main portion 50 of the PC board 5, so that the PC board 5 may be guided by the guiding channels 43 and pushed toward the plastic main body 4 for the insertion portion 51 to pass the opening 41 and project from a front end of the plastic main body 4.

Figure 5:
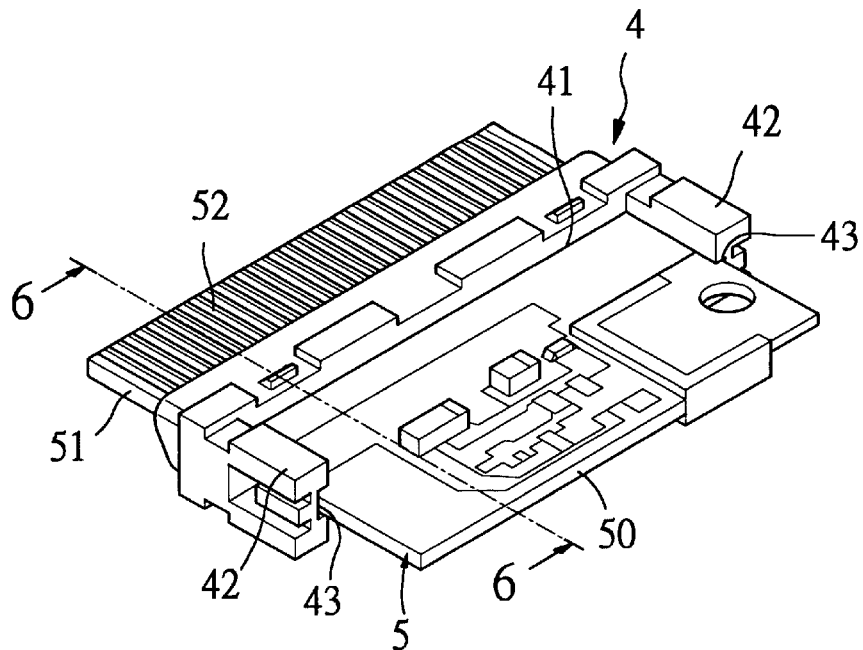
FIG. 5 is an assembled perspective of the interface card connector of FIG. 4.
Figure 6:
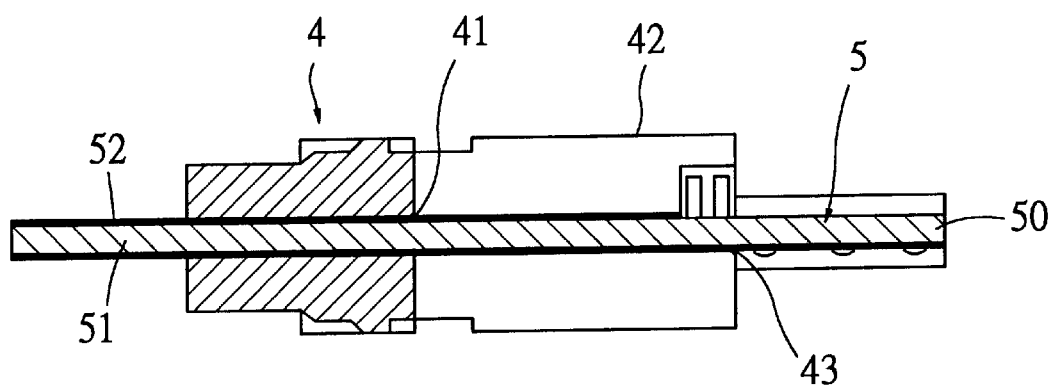
FIG. 6 is a side sectional view taken on line B—B of FIG. 5.

Please now refer to FIGS. 5 and 6. FIG. 5 is an assembled perspective of the interface card connector according to the present invention. FIG. 6 is a side sectional view taken on line B—B of FIG. 5. As shown, the PC board 5 is pushed forward with two sides of the main portion 50 located in the guiding channels 43 on two protective walls 42 of the plastic main body 4. The insertion portion 51 of the PC board 5 extends into the opening 41 and projects from the front end of the plastic main body 4. Since the insertion portion 51 has a width slightly smaller than that of the main portion 50 of the PC board 5 and the opening 41 is designed to allow only the insertion portion 51 to extend thereinto, the PC board 5 which is pushed forward toward the plastic main body 4 shall eventually be stopped from moving any further when the main portion 50 abuts against a rear end of the plastic main body 4. The insertion portion 51 projects from the front end of the plastic main body 4 for a distance similar to the length of the insertion portion 12 of the plastic main body 1 for the conventional interface card connector. Since the insertion portion 51 extended from the main portion 50 of the PC board 5 projects from the plastic main body 4 for a length the same as that provided by the insertion portion 12 in the conventional interface card connector, the PC board 5 may be electrically connected to another matching connector on a peripheral equipment by directly inserting the insertion portion 51 into the matching connector.

Following are advantages of the present invention:

1. Since the PC board can be directly electrically connected to a matching connector via the insertion portion 51 projecting from the front end of the plastic main body, it is not necessary to additionally manufacture the terminals 2. The interface card connector structure of the present invention is largely simplified and the manufacturing cost thereof is therefore reduced.

2. It is not necessary to form terminal insertion holes on the plastic main body 4 and no insertion of the terminals into the terminal insertion holes is needed. The assembly of the interface card connector can therefore be more easily performed.

3. The plastic main body does not have a front insertion portion and can therefore be produced with less material.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. An interface card connector comprising:

a PC board and a plastic main body having no terminals therein without insertion terminals, said PC board includes a main portion and a front insertion portion forwardly extending from said main portion, said insertion portion has a width slightly smaller than that of said main portion of said PC board and a longitudinal length of said insertion portion greater than a longitudinal length of said plastic main body, said PC board is provided on top and bottom surfaces thereof with a plurality of longitudinally extended conductor contacts, said conductor contacts extend the length of said insertion portion, said plastic main body includes a transverse opening to receive said insertion portion of said PC board, two symmetrical protective walls extending from two sides of said plastic main body and having a front end opposite said protective walls, said protective walls are each provided on inner surfaces thereof with a guiding channel, a distance between said two channels is equal to a width of said main portion of said PC board; whereby said PC board is pushed through said plastic main body with said two sides of said main portion engaging said two guiding channels of said protective walls of said plastic main body, and said insertion portion of said PC board passing through and extending past said front end of said plastic main body, such that said PC board may be directly electrically connected to a mating connector on a peripheral unit via said insertion portion of said PC board.

2. The interface card connector as claimed in claim 1 wherein:

said insertion portion of said PC board projects from said plastic main body for a distance equal to a length of an insertion portion provided on a plastic main body of a conventional interface card connector.

\* \* \* \* \*